June 30, 1970  F. G. KRAL  3,517,896
MAGAZINE WITH READILY REMOVABLE CARTRIDGES
Filed April 24, 1967  2 Sheets-Sheet 2
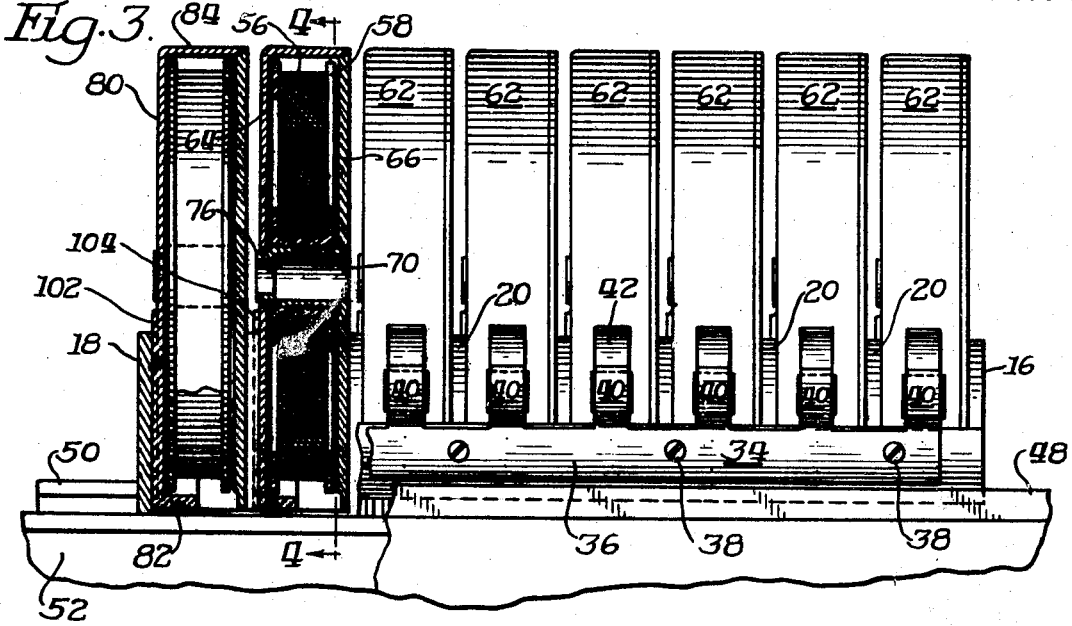
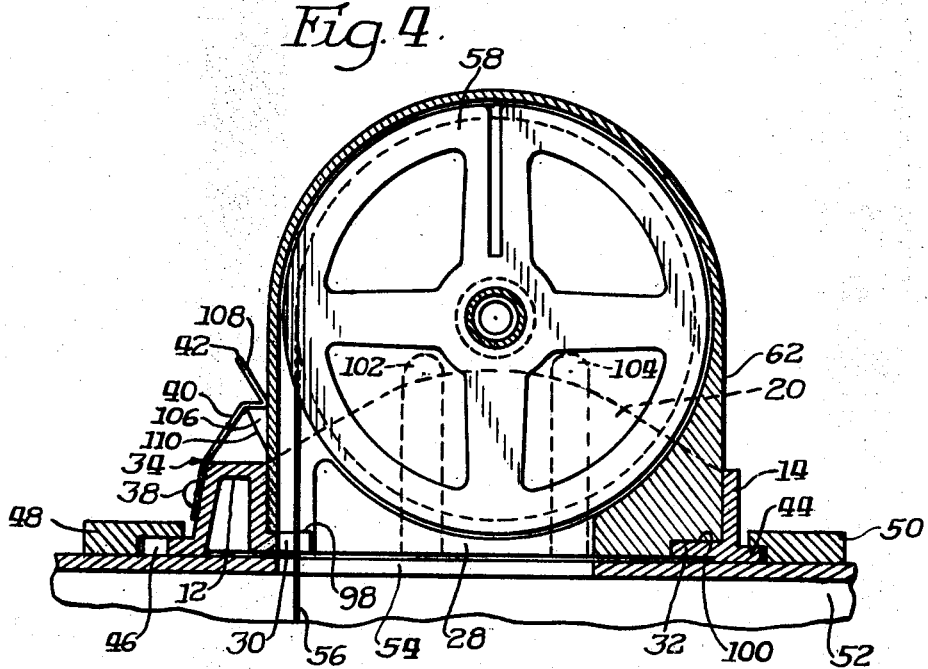
Inventor:
Fred G. Kral
By William J. ......
John E. ...... Jr. Attys `3,517,896`
MAGAZINE WITH READILY REMOVABLE CARTRIDGES
Fred G. Kral, Berwyn, Ill., assignor to Bell & Howell Company, Chicago, Ill., a corporation of Illinois
Filed Apr. 24, 1967, Ser. No. 633,243
Int. Cl. G11b 23/08; B65h 75/00
U.S. Cl. 242—197           9 Claims

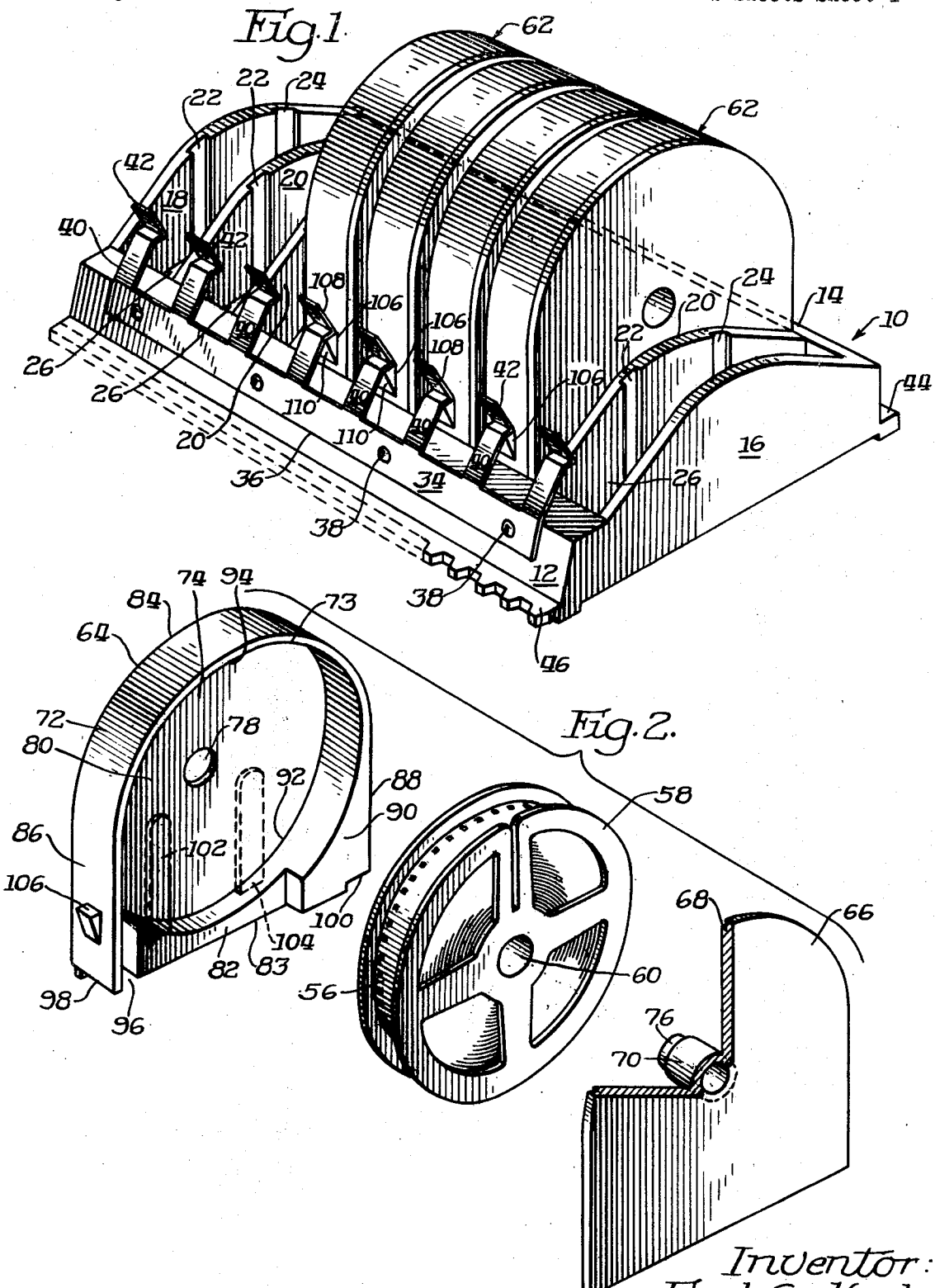

ABSTRACT OF THE DISCLOSURE

An indexable succession of chambers are defined by walls which are conditioned for splined retension and alignment of reel mounted film strip cartridges to permit location of successive film strips into projection position. A cartridge holding spring finger, which yields under manual force, is associated with each chamber and enables selective cartridge removal from, and replacement in, a magazine comprised of said chambers.

---

The present invention relates to film reel conveyor for a motion picture projector. Specifically, the invention concerns improvements in a magazine adapted for releasably securing one of a plurality of film reel cartridges to facilitate editing of a set of cartridge contained film strips.

To minimize motion picture film reel handling during projection of a related set of film strips, indexable conveyors heretofore have been used in assembled association with motion picture projectors to move successive reels of film strips into projection position. Reel support means associated with such conveyors comprise a shaft or spindle adapted to mount all reels of a set of film strips to be projected. As a result, removal from or replacement of a selected reel in a mounted set cannot be achieved without disturbing and handling other reels.

It is an object of the present invention to provide for use with a motion picture film projector an improved magazine construction for containing a plurality of motion picture film reels.

It is another object of the invention to provide a reel cartridge magazine having a plurality of cartridge stations adapted for successive disposition at projection position, and conditioned so that selected reels may be removed from or replaced on said magazine.

It is an additional object of the invention to provide a magazine comprising improved registering means for each cartridge for alignment of its film strip for projection upon corresponding indexing of its station.

It is a further object of the invention to provide a magazine having a plurality of chambers with associated yieldable selectively operable holding means for releasible securance of reels for selective removal or replacement from said magazine.

The foregoing and other objects, features and advantages of the present invention will become more apparent upon consideration of the following description when considered in conjunction with the accompanying drawings wherein the same reference character or numeral refers to like or corresponding parts throughout the several views.

On the drawings:

FIG. 1 is a perspective view of a chamber defining magazine embodying one form of the invention, with cartridges disposed in chambers.

FIG. 2 is an exploded view of a cartridge which can be disposed in each of the chambers in FIG. 1, parts being shown dotted and parts broken away for the purpose of illustration.

FIG. 3 is an elevational view of the magazine looking toward a projector distal side and showing said magazine fully cartridge loaded and mounted for reel translocation, parts being broken away for the purpose of illustration.

FIG. 4 is a vertical sectional view taken substantially on the line 4—4 of FIG. 3 and looking in the direction of the arrows.

Referring now to FIG. 1, a magazine generally designated 10 is seen in the form of a horizontally elongated rack of tray. The magazine comprises a pair of projector distal and proximate side walls 12 and 14 and a pair of parallel end walls 16 and 18, the latter walls being arranged in downstream-upstream association and being integral with the side walls. A plurality of parallel partitions 20, not all of which have been numbered in each view, may be fashioned integrally with the front and rear walls 12 and 14. The partitions 20 extend transversely in spaced apart relationship longitudinally of the magazine.

In the present embodiment, the surfaces of end wall 18 and of partitions 20, facing end wall 16, are each formed with a pair of vertical grooves 22 and 24. Each groove 22 and 24 is respectively aligned longitudinally of the magazine; and each of the grooves opens toward end wall 16, as illustrated in FIG. 1. By reason of the foregoing construction, a plurality of like proportioned cartridge chambers 26 are provided in the magazine between end walls 16 and 18, only unoccupied of said chambers having been numbered in FIG. 1.

Magazine 10 has a longitudinally extending lower opening 28 (FIG. 4) which is disposed between side walls 12 and 14. A shoulder 30, integral with the lower end portion of wall 12 and extending longitudinally thereof, projects into opening 28 and provides a cartridge rest in one side of each magazine chamber 26. An associated shoulder 32, integral with the lower end portion of wall 14 and extending longitudinally thereof, projects into opening 28 and provides a cartridge rest in an opposite side of each of the chambers.

Releasable cartridge holding means comprising a comb spring 34 has a bar 36 which extends longitudinally of the magazine. It is noted that spring 34 may be in the form of plastic fingers integrally molded into magazine 10. Screw fasteners 38, only some of which have been numbered, are projected through the bar 36 and threaded into wall 12 to secure the bar to the outside of wall 12. Comb spring 34 also has a plurality of upwardly and inwardly extending parallel leaflike spring fingers 40. Each finger is associated with a chamber 26. A downwardly biased detent 42 herein is shown as being formed integrally with the upper end portion of each spring finger 40.

To facilitate advance of the magazine during indexing, wall 14 has a sidewardly projecting longitudinally extending slide bar or strip 44. An opposite slide strip, shaped as a localizing means or rack 46, extends longitudinally of the magazine projecting sidewardly from wall 12. The slide bar 44 and rack 46 are adapted for engagement beneath hold down track means 48 and 50 (FIGS. 3 and 4). The latter members are included as components of a motion picture projector, generally designated 52 (FIG. 3), with which magazine 10 is adapted for use. The projector has a film strip receiving opening 54 (FIG. 4), but comprises no part of the present invention and accordingly details of its construction, except to the extent shown, are omitted from the drawings. Rack 46 is adapted for engagement by conventional indexing means, such as an intermittently activated pinion means (not shown). The indexing means is adapted for indexing said magazine to operatively align successive chambers 26 in film delivery association with projector opening 54.

Film strips 56 for projection are arranged on a plurality of reels 58. The reels may be of conventional construction and have central or axial openings 60. A cartridge generally designated 62, which is compatibly fashioned for reception in each chamber 26, is adapted to rotationally mount a reel 58. To that end, each illustrated cartridge 62 comprises a body section 64 and a cover section 66, as illustrated in FIG. 2.

Each cartridge cover section 66 is an essentially flat, peripherally U-shaped member. About a peripheral portion of the section is, shaped a snap shoulder or seat 68, on which the body section 64 engages for assembly of the cartridge in operable or closed condition. A spindle 70 projects normally from a medial portion of each cartridge section 66, and defines an axis of rotation for a reel 58. The spindle is passed through the opening 60 in the reel to support the reel for rotation during projection or rewind of a film strip about the reel. As illustrated in FIG. 3, each spindle 70 may be struck inwardly from its cartridge section 66.

Each cartridge body section 64 has a flat surface 80 which is parallel to its cover section 66 when operatively conditioned. Each section 64 also presents a U-shaped peripheral profile and has a normal peripheral flange 72 which serves to space opposite cartridge sections apart. An outer peripheral edge 73 of each flange 72 is adapted for snap fit on an associated shoulder 68 for cartridge assembly. Each cartridge section 64 defines within its flange 72 a reel chamber 74 (FIG. 2) adapted for reception of a reel 58 mounted on a spindle 70. To lend further operative support to each operatively conditioned spindle 70, an end portion 76 (FIG. 3) of the spindle is shaped for bearing engagement in an opening 78 formed in flat 80 of each cartridge section 64.

Each flange 72 has a bottom section 82 with a base flat 83. Moreover, each flange has an upper circular arc portion 84 and a pair of parallel peripherally straight sides 86 and 88 (FIG. 2). A unitary thickened inner part 90 of each flange bottom 82 and side 88 is shaped to generate an inner circular arc 92 which is coextensive with and of the same radius as the inner circular arc 94 defined by associated flange portion 84. The foregoing arrangement provides an inner wall comprising a circular arc of about 315° which limits each reel chamber 74. Each bottom section 82 has a film strip slot 96 adjacent its side 86. Each slot 96 is adapted for alignment with projector opening 54 for passage from its cartridge chamber 74 of a therein mounted film strip into the projector.

Flange sides 86 and 88 of each cartridge are undercut or recessed to provide a pair of opposite shoulders 98 and 100 (FIGS. 2 and 4), which are proportioned for engagement on rests 30 and 32 of magazine 10. Moreover, each cartridge is proportioned in a manner such that when operatively conditioned it is snugly through upwardly and downwardly slidably disposed in a chamber 26.

To the end that each cartridge will be suitably registered for film strip feeding when indexed for that purpose, a pair of splines 102 and 104 are arranged vertically on the exterior surface of each cartridge flat 80. The splines are proportioned for snug and sliding engagement in grooves 22 and 24 to rigidly lock the cartridges from undesirable rocking in the magazine. Additionally, each cartridge has or is fashioned with a catch 106 (FIG. 2) proportioned and arranged for cartridge locking engagement from above by a biased detent 42 of the comb spring fingers 40 when such cartridge is in seated position in the magazine. When so engaged, a cartridge may be removed from the magazine by manual elevation, after disengagement of the holding detent. From the foregoing, it is evident that editing of individual cartridges in said magazine can be simply and easily achieved without disturbing other cartridges.

As illustrated in FIG. 1, each detent 42 has a sloping face 108, only some of which have been numbered in the drawings. Each catch 106 has a sloping face 110 arranged and proportioned in a manner such that as a cartridge is moved downwardly toward seated condition in the magazine it will engage a corresponding sloping face 108 to bend its detent against its spring bias out of the cartridge path. The parts are proportioned and arranged so that when a cartridge is seated, associated faces 108 and 110 have cleared each other to lock such cartridge as aforesaid.

While the invention has been particularly described with reference to a specific embodiment thereof, it is to be understood that modifications and variations may be effected without departing from the spirit and scope of the invention as set forth in the appended claims.

The embodiments of the invention in which an exclusive property or privilege is claimed are defined as follows:

1. A magazine for supporting a plurality of cartridges containing film strips adapted for projection in a motion picture projector, comprising:
   an indexable conveyor having a plurality of stations for film delivery to a fixed projector location for film strip withdrawal for projection;
   means on said conveyor enabling positioning of one of a plurality of cartridges at corresponding positions at said location; and
   manually operable means arranged for cooperation with means on cartridges for releasably holding a cartridge in association with each of said stations.

2. Magazine means as in claim 1 in which the conveyor is adapted for movement longitudinally of a path and has a plurality of adjacent station defining chambers disposed longitudinally of said magazine, said manually operable means comprising a spring comb having a bar secured longitudinally of said magazine and a plurality of bendable fingers associated with said chambers, respectively, and normally tensioned for cartridge retention.

3. Magazine means as in claim 1 in which said positioning means comprises a rack means extending normally of the path of conveyor indexing and fashioned externally of the conveyor for cooperation with a conveyor indexing means.

4. Magazine means as in claim 1 characterized by a cartridge selectively removably mounted on said conveyor at each station and including an axle for support of a reel and to permit removal of the reel from the cartridge.

5. Magazine means as in claim 1 in which each cartridge has a catch and said manually operable means comprises a plurality of bendable fingers, each finger having a detent portion releasably engaging a corresponding catch on each corresponding cartridge.

6. A magazine for film reel cartridges adapted for successive indexing movement into operable position for withdrawal of successive film strips for projection by a motion picture projector, said magazine comprising:
   an indexable tray;
   a plurality of parallel partitions extending transversely of said tray and defining a plurality of upwardly opening cartridge chambers arranged longitudinally of the indexing path of said tray;
   a pair of opposed hold down flanges projecting from said tray longitudinally thereof for indexably securing said magazine on a motion picture projector, one of said flanges defining a rack adapted for engagement to index said magazine;
   a spline normal to the path of tray indexing arranged on a partition of each chamber for engagement with a compatible part of a reel cartridge for its entrance into and exit from a corresponding chamber;
   a spring comb secured longitudinally of said tray and having a bendable spring finger biasedly extending into each chamber and proportioned to be pushed out by a therein entering cartridge; and
   a detent on each spring finger to engage a compatible cartridge catch under spring biasing to releasably hold a cartridge on said magazine.

7. Magazine means as in claim 1 in which said manually operable means comprise selectively operable spring members arranged to cooperate with a portion of a corresponding cartridge and normally tensioned for releasably securing said cartridge at its station.

8. Magazine means as in claim 1 in which said conveyor includes a plurality of parallel partitions extending transversely of the indexing path of said tray and defining said plurality of cartridge receiving stations along the indexing path of said tray.

9. Magazine means as in claim 8 in which each of said cartridge receiving stations is provided with means arranged for engagement with a complementary part of a cartridge for guided entrance of said cartridge into and exit from a corresponding station.

References Cited

UNITED STATES PATENTS

| 1,267,017 | 5/1918 | Vickers. | |
|---|---|---|---|
| 2,561,503 | 7/1951 | D'Ornellas | 242—55.13 X |
| 3,139,788 | 7/1964 | Hughes et al. | 352—123 |
| 3,342,431 | 9/1967 | Mouissie | 242—71.1 X |
| 3,342,541 | 9/1967 | Mouissie et al. | 352—125 X |
| 3,346,210 | 10/1967 | Carstensen et al. | 242—71.1 |
| 3,383,156 | 5/1968 | Fried et al. | 352—123 |

GEORGE F. MAUTZ, Primary Examiner